United States Patent [19]

Harris et al.

[11] 4,268,334

[45] May 19, 1981

[54] PIPE WRAPPING ADHESIVE TAPE METHOD

[75] Inventors: George M. Harris, Bolton; Samuel J. Thomas, Hamilton, both of Mass.

[73] Assignee: The Kendall Company, Walpole, Mass.

[21] Appl. No.: 90,000

[22] Filed: Oct. 31, 1979

[51] Int. Cl.³ ............................................ B65H 81/00
[52] U.S. Cl. .................................. 156/187; 138/144; 138/DIG. 1; 156/192; 156/195; 156/334; 260/33.6 AQ; 427/208.2; 428/355; 428/462; 526/220; 526/339
[58] Field of Search ............... 156/187, 195, 192, 334; 260/33.6 AQ; 526/220, 339; 428/335, 462; 138/144, DIG. 1; 427/208.2

[56] References Cited

U.S. PATENT DOCUMENTS

| | | | |
|---|---|---|---|
| 2,442,083 | 5/1948 | Hall et al. | 428/355 |
| 2,771,936 | 11/1956 | Iknayan et al. | 156/334 |
| 3,033,724 | 5/1962 | Stokes | 156/187 |
| 3,258,388 | 6/1966 | Coleman et al. | 156/331 |
| 3,616,006 | 10/1971 | Landgrof et al. | 156/195 |
| 3,674,735 | 7/1972 | Callan | 260/33.6 AQ |

FOREIGN PATENT DOCUMENTS 1161117  8/1969  United Kingdom ....... 260/33.6 AQ

*Primary Examiner*—John J. Gallagher

[57] ABSTRACT

In a pipe coating made by wrapping the pipe with polyolefin tape and a butyl rubber based adhesive, the strength of the bond to the pipe at elevated temperature is improved by incorporating in the adhesive a crosslinking agent which is either 0.15–1% by weight of p-dinitrosobenzene or 1.0 to 2.5% of p-quinonedioxime, or both together with an activator.

7 Claims, 1 Drawing Figure

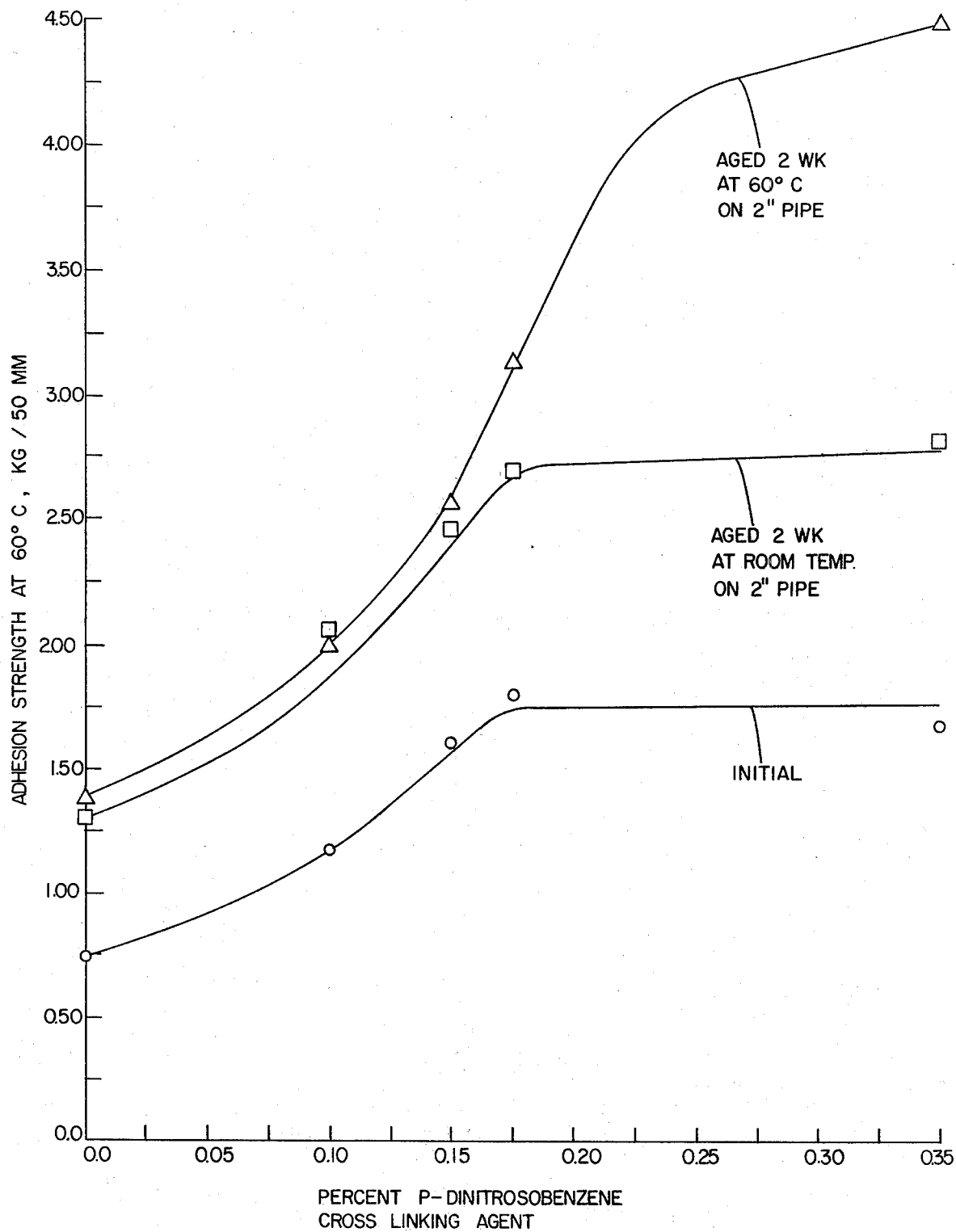

PIPE WRAPPING ADHESIVE TAPE METHOD

This invention relates to protective coatings for metal pipes, particularly large diameter steel pipes for underground pipelines, and pertains more specifically to helical wrapping of pipe with polyolefin sheet or tape and a layer of butyl-based adhesive. The tapes are applied either at the job site or at a coating plant.

It has previously been the practice to provide pipe coatings by supplying in roll form preformed polyolefin tape having one face coated with butyl-based adhesive comprising a blend of reclaimed butyl rubber with virgin butyl rubber. It has also been proposed to extrude the tape and adhesive layer simultaneously, either separately or as a coextrusion, directly on to the surface of the rotating pipe. In the case of the preformed tape, it has been the practice, in order to prevent edge bleeding of the adhesive layer from the roll of tape to include a low level of cross-linking agent in the form of less than 0.08% by weight based on the total adhesive mass, of p-dinitrosobenzene along with sufficient zinc oxide (from 30 to 60 times the weight of the cross-linking agent) to activate it. This amount of cross-linking agent has no appreciable effect upon bond strength of the tape after it has been applied to the pipe.

It has now been found that the incorporation in the butyl-based adhesive of a cross-linking agent in an amount in excess of a threshold value (0.15% by weight of the total adhesive mass in the case of p-dinitrosobenzene; 1.0% in the case of p-quinonedioxime), along with a metal oxide activator such as zinc oxide or lead oxide, produces a marked increase in adhesive bond strength as measured by the force required to peel the wrapping from the pipe. The tape carrying its layer of adhesive is normally heated above room temperature during the course of manufacture, causing the butyl adhesive to become partially or completely cross-linked. When the butyl adhesive on the tape is only partially cross-linked before the tape is wrapped on the pipe, cross-linking continues after it is wrapped on the pipe as shown by the fact that the adhesive bond strength continues to increase after the wrapping is applied to the pipe when the pipe is maintained at room temperature or at elevated temperature, even though the adhesive composition during the course of its manufacture has been subjected to much higher temperatures of the order of 205° C.

In the drawing, the single FIGURE is a plot of the amount of cross-linking agent present in the butyl-based adhesive layer versus adhesion force as measured by a peel adhesion test method.

The present invention consequently comprises, in the method of coating metal pipe by wrapping it with tape comprising a polyolefin backing and an adhesive layer comprising a blend of butyl rubber with a tackifying agent, the improvement which comprises incorporating in the adhesive layer a cross-linking agent selected from the group consisting of 0.15 to 1.0% by weight of p-dinitrosobenzene, 1.0 to 2.5% by weight of p-quinonedioxime and a mixture of both of the foregoing, based on the total weight of the adhesive layer, along with an activator, preferably a metal oxide activator such as zinc oxide or lead oxide, e.g., red lead oxide. When the cross-linking agent is p-dinitrosobenzene, it is preferred to use zinc oxide as the activator, although mixtures of zinc oxide with lead oxide can be used. When the cross-linking agent is p-quinonedioxime, a lead oxide is the preferred activator, although a mixture of lead oxide and zinc oxide can be used.

In practicing the method of the present invention, the polyolefin backing of the tape or sheet may be any conventional homopolymer or graft copolymer of an olefin having from 2 to 4 carbon atoms such as ethylene, propylene or butylene. The backing may be preformed, as for example by calendering, and coated with the adhesive mass before use, or it may be formed by extrusion directly on to the surface of the pipe. In the latter case, the adhesive mass is preferably extruded simultaneously, either separately or as a coextrusion with the backing.

The butyl based adhesive composition comprises butyl rubber, that is either virgin butyl rubber or a blend of virgin with reclaimed butyl rubber. The virgin butyl rubber preferably has an unsaturation of at least 0.4%, but the unsaturation may be much higher, as much as 2.5%. Any conventional reclaimed rubber can be used including reclaimed natural rubber, and reclaimed synthetic rubbers such as reclaimed butadiene-styrene copolymer rubber or reclaimed butyl rubber, the latter being preferred. Reclaimed rubber having a Mooney viscosity from 40 to 70 is preferred. The virgin butyl rubber preferably amounts to 20 to 100% by weight of the total rubber present in the composition, the reclaimed butyl rubber forming the balance of the rubber in the case of a blend. In addition to the foregoing components and the cross-linking agent and zinc oxide or lead oxide activator, there must also be present in the adhesive composition a conventional tackifying agent such as a hydrocarbon tackifier, e.g., a low molecular weight polyisobutylene, or any any other conventional tackifying agent such as rosin or rosin derivatives, coumarone-indene resin, or the like. The tackifying agent may be present in any usual amount from 10% to 25% by weight based on the weight of the virgin butyl rubber. Any of the other usual compounding ingredients may also be present in the adhesive composition, such as a conventional anti-oxidant or a filler such as clay, or an extender such as polyisobutylene.

When the cross-linking agent used is p-dinitrosobenzene, the ratio of activator to cross-linking agent should be at least 35:1 by weight; when the cross-linking agent is p-quinonedioxime, the ratio should be at least 4:1 by weight. While larger ratios can be used, there is no advantage in increasing the ratio above the minimum set forth above. Although any oxide of lead can be used, red lead oxide ($Pb_3O_4$) is preferred.

The following specific examples are intended to illustrate more fully the nature of the invention without acting as a limitation upon its scope.

EXAMPLES

The following adhesive compositions were prepared by mixing all of the ingredients except the last in a Banbury, then adding the tackifier on a two-roll mill. The parts are by weight percent of total adhesive.

TABLE 1

| Example Component | 1 | 2 | 3 | 4 | 5 |
|---|---|---|---|---|---|
| Blend of virgin butyl rubber (1.4% unsaturation) and reclaimed butyl rubber (40–70 Mooney viscosity) | 37.5 | 44.1 | 44.1 | 44.1 | 41.9 |
| Polyac (25% p-dinitrosobenzene | | | | | |

TABLE 1-continued

| Example Component | 1 | 2 | 3 | 4 | 5 |
|---|---|---|---|---|---|
| and 75% wax) | — | 0.4 | 0.6 | 0.7 | 1.4 |
| Zinc oxide | — | 3.6 | 5.3 | 6.2 | 12.3 |
| Tackifier | 14.1 | 14.0 | 14.0 | 14.0 | 14.1 |
| Antioxidant | 0.4 | 0.25 | 0.25 | 0.25 | 0.3 |
| Filler and extender | 48.1 | 37.6 | 35.6 | 34.7 | 30.0 |

The compositions of the several examples were applied by calendering as a continuous layer approximately 9 mils thick on a polyethylene backing of 11 mils gauge.

A two inch steel pipe was cleaned and coated at room temperature with a conventional primer in the form of a solution or dispersion in a volatile solvent of reclaimed natural rubber, tackifier, and antioxidant, and allowed to dry. The product of each example in the form of a tape 50 millimeters wide was then wrapped upon a different specimen of the pipe at room temperature with its adhesive layer next to the primed pipe. One sample of each assembly was aged for 4 hours at 60° C., was then tested for peel adhesion at 60° C. by measuring the force required to pull the tape from the pipe in a direction perpendicular to the pipe surface at the rate of 1 inch per minute. Another sample of the assembly of each example was allowed to stand for two weeks at room temperature, then tested in the same manner (including 4 hours aging) at 60° C., while a third sample of each example was heated at 60° C. for 2 weeks before testing under the same conditions. The results of the tests are set forth in the following table and are shown graphically in the drawing.

TABLE 2

| | Adhesion Strength at 60° C. Kg/50 mm. width | | |
|---|---|---|---|
| Example | Before Aging | Aged Two Weeks at Room Temp. | Aged Two Weeks at 60° C. |
| 1 | 0.74 | 1.29 | 1.38 |
| 2 | 1.17 | 2.09 | 2.01 |
| 3 | 1.63 | 2.47 | 2.58 |
| 4 | 1.84 | 2.66 | 3.16 |
| 5 | 1.68 | 2.79 | 4.49 |

It is clear from the results that there is a threshold concentration of cross-linking agent, about 0.15% by weight of the adhesive composition, below which no effect is produced upon the adhesion strength, while above that concentration, the cross-linking agent is effective to increase markedly the peel strength. Analogous results are obtainable using p-quinonedioxime as the cross-linking agent except that the threshold concentration is about 1.0% by weight of the adhesive mass. Similar results are obtained when both p-quinonedioxime and p-dinitrosobenzene are used together in a single composition.

What is claimed is:

1. In the method of coating steel pipe by wrapping it with a tape comprising a polyolefin backing and an adhesive layer comprising a blend of virgin butyl rubber with reclaimed butyl rubber and a tackifying agent, the procedure for increasing the strength of the adhesive bond which comprises incorporating in the adhesive layer a cross-linking agent selected from the group consisting of (A) 0.15 to 1.0% by weight of p-dinitrosobenzene, (B) 1.0 to 2.5% by weight of p-quinonedioxime, and (C) a mixture of (A) and (B) based on the total weight of said adhesive layer, together with an activator.

2. The method as claimed in claim 1 in which said virgin butyl rubber has an unsaturation of 0.4 to 2.4%, and the reclaimed butyl rubber has a Mooney viscosity from 40 to 70.

3. The method as claimed in claim 1 or claim 2 in which said cross-linking agent is 0.15 to 1.0% be weight of p-dinitrosobenzene.

4. The method as claimed in claim 1 or claim 2 in which said cross-linking agent is 0.15 to 1.0% by weight of p-dinitrosobenzene and said activator is zinc oxide in an amount at least 35 times the weight of said cross-linking agent.

5. The method as claimed in claim 1 or claim 2 in which said cross-linking agent is 1.0 to 2.5% by weight of p-quinonedioxime.

6. The method as claimed in claim 1 or claim 2 in which said cross-linking agent is 1.0 to 2.5% by weight of p-quinonedioxime and said activator is red lead oxide in an amount at least 4 times the weight of said cross-linking agent.

7. The method as claimed in claims 1 or 2 including the steps of heating during manufacture said adhesive layer to produce partial cross-linking before said tape is wrapped on said pipe, and completing the cross-linking after said tape is wrapped on said pipe.

* * * * *